US012732741B2

(12) United States Patent
Zeng et al.

(10) Patent No.: US 12,732,741 B2
(45) Date of Patent: Sep. 8, 2026

(54) EARPHONE CONNECTION METHOD AND APPARATUS, EARPHONE, AND MEDIUM

(71) Applicant: GOERTEK INC., Weifang (CN)

(72) Inventors: Kai Zeng, Shandong (CN); Qian Zhang, Shandong (CN)

(73) Assignee: Goertek Inc., Weifang (CN)

( * ) Notice: Subject to any disclaimer, the term of this patent is extended or adjusted under 35 U.S.C. 154(b) by 156 days.

(21) Appl. No.: 18/858,444

(22) PCT Filed: Jun. 29, 2022

(86) PCT No.: PCT/CN2022/102103
§ 371 (c)(1),
(2) Date: Oct. 21, 2024

(87) PCT Pub. No.: WO2023/201885
PCT Pub. Date: Oct. 26, 2023

(65) Prior Publication Data

US 2026/0189844 A1 Jul. 2, 2026

(30) Foreign Application Priority Data

Apr. 22, 2022 (CN) ......................... 202210431419.7

(51) Int. Cl.
*H04R 1/10* (2026.01)
*H04W 4/02* (2018.01)

(52) U.S. Cl.
CPC .......... *H04R 1/1091* (2013.01); *H04W 4/023* (2013.01); *H04R 2420/01* (2013.01); *H04R 2420/03* (2013.01); *H04R 2420/05* (2013.01)

(58) Field of Classification Search
CPC .............. H04R 1/1091; H04R 2420/01; H04R 2420/03; H04R 2420/05; H04W 4/023
See application file for complete search history.

(56) References Cited

FOREIGN PATENT DOCUMENTS

CN 114173285 A 3/2022
CN 114245362 A 3/2022

OTHER PUBLICATIONS

English machine translation of CN 114173285 (Shen et al.; Bluetooth reconnection method and system, electronic equipment, server and storage medium; published Mar. 2022) (Year: 2022).*

* cited by examiner

*Primary Examiner* — Mark Fischer
(74) *Attorney, Agent, or Firm* — Baker Botts LLP

(57) ABSTRACT

The present disclosure provides an earphone, a connection method and apparatus therefor, and a medium. The method comprises: acquiring first location information of a first electronic device to be back-connected; wherein the first location information is location information of the first electronic device during a last communication connection with the earphone; acquiring current location information of a second electronic device that has already established a communication connection; if a distance between the first location information and the current location information is outside a set distance range, adjusting a back-connecting parameter for back-connecting the first electronic device; and back-connecting the first electronic device according to an adjusted back-connecting parameter.

10 Claims, 5 Drawing Sheets

EARPHONE CONNECTION METHOD AND APPARATUS, EARPHONE, AND MEDIUM

CROSS-REFERENCE TO RELATED APPLICATIONS

The present disclosure is a National Stage of International Application No. PCT/CN2022/102103, filed on Jun. 29, 2022, which claims priority to a Chinese patent application No. 202210431419.7 filed with the CNIPA on Apr. 22, 2022 and entitled "EARPHONE CONNECTION METHOD AND APPARATUS, EARPHONE, AND MEDIUM", both of which are hereby incorporated by reference in their entireties.

TECHNICAL FIELD

The present disclosure relates to the technical field of intelligent devices, and particularly to a connection method for an earphone, a connection apparatus for an earphone, an earphone, as well as a computer-readable storage medium.

BACKGROUND

With the development of technologies, more and more True Wireless Stereo (TWS) earphones support multi-point connection functions, which brings users a more convenient connection experience, and the more common implementation scheme is dual-device connections, that is, the same pair of TWS earphones may be connected to two main devices simultaneously. For example, the same pair of TWS earphones can be connected to two mobile phones simultaneously, or the same pair of TWS earphones may be connected to one mobile phone and one computer simultaneously.

However, in actual use, it often happens that the earphones have already connected to one of the two devices, and the earphones will try to back-connect the other of the two devices. However, if the other device is not within the range of the back-connection distance, it will cause meaningless back-connection attempts. Additionally, since the back-connection process consumes a significant amount of bandwidth, it may also influence the services of the already connected device, such as causing the already connected device to experience sound lagging and so on.

SUMMARY

An objective of the present disclosure is to provide a new technical solution for connection of an earphone.

According to a first aspect of the present disclosure, a connection method for an earphone is provided, comprising:

acquiring first location information of a first electronic device to be back-connected; wherein the first location information is location information of the first electronic device when it previously established a communication connection with the earphone;

acquiring current location information of a second electronic device that has already established a communication connection;

if a distance between the first location information and the current location information is not within a set distance range, adjusting a back-connecting parameter for back-connecting the first electronic device;

back-connecting the first electronic device according to an adjusted back-connecting parameter.

Optionally, the method further comprises:

acquiring a service status between the earphone and the second electronic device;

if the service status is not an audio service status, then executing a step of "back-connecting the first electronic device according to an adjusted back-connecting parameter".

Optionally, the method further comprises:

if the service status is the audio service status, suspending execution of the step of "back-connecting the first electronic device according to an adjusted back-connecting parameter", and continuing with execution of a step of "acquiring a service status between the earphone and the second electronic device".

Optionally, said "if a distance between the first location information and the current location information is not within a set distance range, adjusting a back-connecting parameter for back-connecting the first electronic device" comprises:

if a distance between the first location information and the current location information is not within a set distance range, adjusting at least one of back-connecting frequency of the earphone back-connecting the first electronic device, back-connecting times of the earphone back-connecting the first electronic device, and back-connecting time interval of the earphone back-connecting the first electronic device.

According to a second aspect of the present disclosure, a connection apparatus for an earphone is provided, comprising:

an acquiring module configured for acquiring first location information of a first electronic device to be back-connected; wherein the first location information is location information of the first electronic device when it previously established a communication connection with the earphone;

the acquiring module is configured for acquiring current location information of a second electronic device that has already established a communication connection;

an adjusting module configured for if a distance between the first location information and the current location information is not within a set distance range, adjusting a back-connecting parameter for back-connecting the first electronic device;

a back-connecting module configured for back-connecting the first electronic device according to an adjusted back-connecting parameter.

Optionally, the acquiring module is configured for acquiring a service status between the earphone and the second electronic device;

the back-connecting module is configured for if the service status is not an audio service status, then back-connecting the first electronic device according to an adjusted back-connecting parameter.

Optionally, the back-connecting module is further configured for if the service status is the audio service status, suspending back-connection of the first electronic device according to an adjusted back-connecting parameter, and continuing to acquire a service status between the earphone and the second electronic device by the acquiring module.

Optionally, the adjusting module is specifically configured for: if a distance between the first location information and the current location information is not within a set distance range, adjusting at least one of back-connecting frequency of the earphone back-connecting the first electronic device, back-connecting times of the earphone back-connecting the first electronic device, and back-connecting time interval of the earphone back-connecting the first electronic device.

According to a third aspect of the present disclosure, an earphone is provided, comprising:

- a memory configured for storing executable computer instructions; and
- a processor configured for executing the connection method for the earphone according to the above first aspect under control of the executable computer instructions.

According to a fourth aspect of the present disclosure, a computer-readable storage medium is provided, which has computer instructions stored thereon, and executes the connection method for the earphone according to the above first aspect when the computer instructions are run by a processor.

A beneficial effect of the present disclosure is that for the dual-connection scenario of an earphone, the earphone will first acquire current location information of a second electronic device that has already established a communication connection, as well as first location information of a first electronic device to be back-connected, wherein the first location information is location information of the first electronic device when previously establishing a communication connection with the earphone, and if a distance between the first location information and the current location information is not within a set distance range, adjusting a back-connecting parameter for back-connecting the first electronic device, and back-connecting the first electronic device according to an adjusted back-connecting parameter. That is, the earphone may, based on current location information of a second electronic device that has already established a communication connection, adjust the back-connecting parameter of the first electronic device to be back-connected, so as to reduce the power consumption caused by back-connecting the first electronic device, save bandwidth, and avoid influence on the services of the already connected device.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings incorporated in and constituting a part of the specification illustrate embodiments of present disclosure and together with the description thereof, serve to explain the principles of the disclosure.

DETAILED DESCRIPTION

Various exemplary embodiments of the present disclosure will now be described in detail with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further reference thereof may be omitted in the subsequent drawings.

Hardware Configuration

Figure 1:
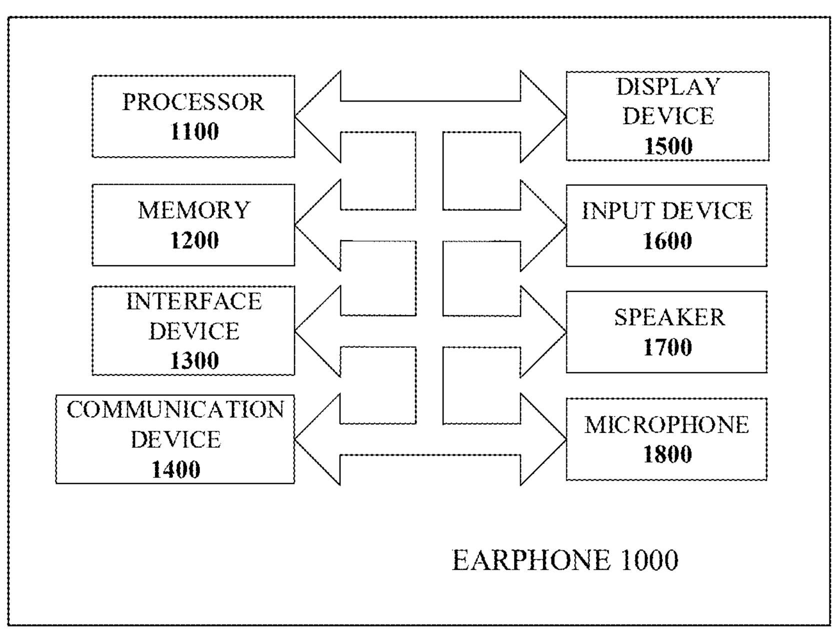
FIG. 1 is a hardware configuration diagram of an earphone according to an embodiment of the present disclosure.

FIG. 1 is block diagram of a hardware configuration of an earphone 1000 according to an embodiment of the present disclosure.

In an embodiment, as shown in FIG. 1, the earphone 1000 may comprise a processor 1100, a memory 1200, an interface device 1300, a communication device 1400, a display device 1500, an input device 1600, a speaker 1700, a microphone 1800, etc.

Wherein, the processor 1100 may comprise, but is not limited to, a central processing unit (CPU), a microprocessor (MCU), and the like. The memory 1200 comprises, for example, a ROM, a RAM, a nonvolatile memory such as a hard disk, and the like. The interface device 1300 comprises, for example, various bus interfaces such as a serial bus interface (comprising a USB interface), a parallel bus interface, and the like. The communication device 1400 is capable of wired or wireless communication, for example. The display device 1500 is, for example, a liquid crystal display, an LED display, a touch panel, or the like. The input device 1600 comprises, for example, a touch screen, a keyboard, a joystick, and the like. The earphone 1000 may output audio information through a speaker 1700, and may collect audio information through the microphone 1800.

It should be understood by the skilled person in the art that although a plurality of devices of the earphone 1000 are shown in FIG. 1, the earphone 1000 of the embodiment of the present specification may only involve a part of the devices therein, and may also comprise other devices, which is not limited herein.

In the present embodiment, the memory 1200 of the earphone 1000 is configured for storing an instruction for controlling the operation of the processor 1100 to implement or support the implementation of the connection method for an earphone according to any of the embodiments. The skilled person may design the instruction according to that scheme disclosed in the present specification. How the instruction control the operation of a processor is well known in the art and will not be described in detail herein.

In the above description, the skilled person may design the instructions according to the scheme provided by the present application. How the instruction control the operation of a processor is well known in the art and will not be described in detail herein.

The earphone shown in FIG. 1 is merely illustrative and is in no way intended to limit the present application, its application, or uses.

Method Embodiment

Figure 2:
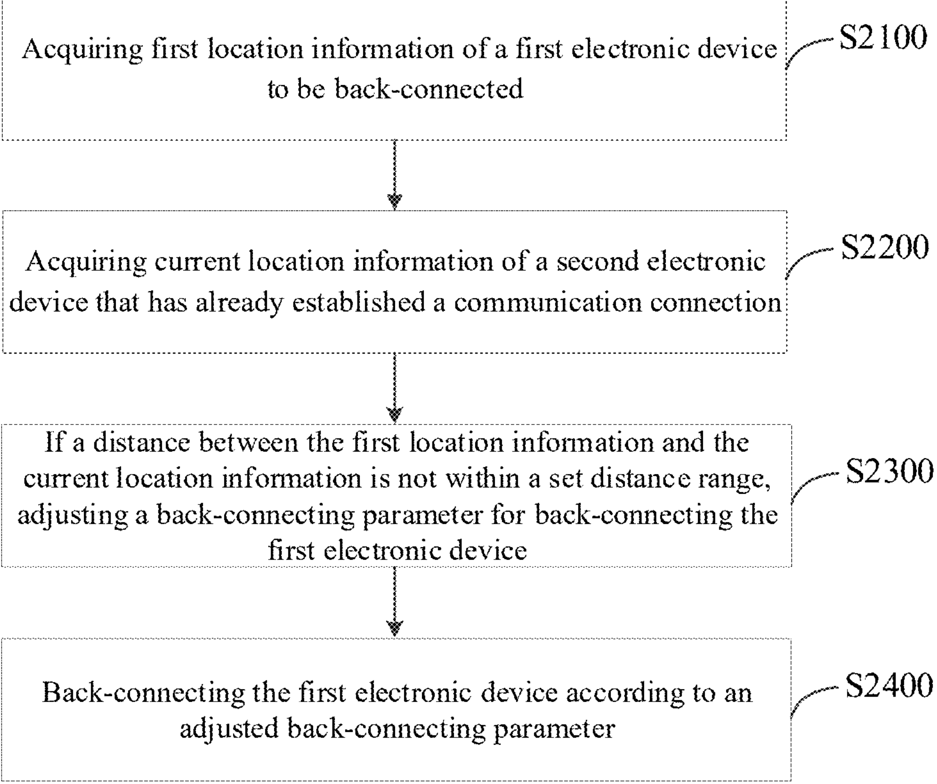
FIG. 2 is a schematic flow chart of a connection method for an earphone according to an embodiment of the present disclosure.

FIG. 2 shows a connection method for an earphone of an embodiment of the present disclosure, which may be implemented, for example, by the earphone 1000 as shown in FIG. 1.

As shown in FIG. 2, the connection method for an earphone in the present embodiment may comprise the following steps S2100 to S2400:

step S2100: acquiring first location information of a first electronic device to be back-connected.

In the present embodiment, the earphone may realize dual-device connection, that is, the same pair of earphones may be connected to two devices simultaneously. For example, the same pair of earphones may be connected to two mobile phones simultaneously; alternatively, the same pair of earphones may be connected to a mobile phone and a computer simultaneously. It may be understood that when pairing relationships has been established between the earphone and the two devices, the earphone will automatically connect the two devices, and the operation of the earphone automatically connecting the devices may be referred to as a back-connecting operation.

Wherein, the first location information is location information of the first electronic device when it previously established a communication connection with the earphone.

In specific implementation, the first electronic device is one of the devices which the earphone is about to back-connect, and herein, when the earphone previously back-connected the first electronic device, that is, when the earphone previously established the communication connection with the first electronic device, the first electronic device synchronizes its own location information, i.e., the first location information (Loc1), with the earphone, and the earphone stores the first location information Loc1 in a storage module of the earphone for reading.

After executing the step S2100 of "acquiring first location information of a first electronic device to be back-connected", proceeding to:

step S2200: acquiring a current location information of a second electronic device that has already established a communication connection.

The second electronic device is another device that has already established the communication connection with the earphone. Here, the positioning device of the second electronic device acquires its own current location information (Loc2), and synchronizes the current location information Loc2 with the earphone. It can be understood that the current location information Loc2 may reflect the current location information of the wearer of the earphone.

After executing the step S2200 of "acquiring current location information of a second electronic device that has already established a communication connection", proceeding to:

step S2300: if a distance between the first location information and the current location information is not within a set distance range, adjusting a back-connecting parameter for back-connecting the first electronic device.

The back-connecting parameter for back-connecting the first electronic device comprises: back-connecting frequency of the earphone back-connecting the first electronic device, back-connecting times of the earphone back-connecting the first electronic device, and back-connecting time interval of the earphone back-connecting the first electronic device.

The set distance range may be a numerical value set according to an actual application scenario and an actual requirement, and the set distance range may be within 1,000 meters or within several hundred meters.

In a specific implementation, as described above, when the communication connection is established between the earphone and the second electronic device, the positioning device of the second electronic device acquires its own current location information Loc2, and synchronizes the current location information Loc2 with the earphone. The current location information Loc2 may reflect the current location information of the wearer of the earphone. In addition, the first electronic device that the earphone is about to back-connect will also synchronize its own first location information Loc1 when the first electronic device previously established the communication connection with the earphone, with the earphone. In this way, the earphone may acquire the first location information Loc1 of the first electronic device and the current location information Loc2 of the second electronic device, and when the distance between the first location information Loc1 and the current location information Loc2 is within the set distance range, for example, within 1 kilometer, the first electronic device is considered to be within the back-connection distance range. On the contrary, in the case where the distance between the first location information Loc1 and the current location information Loc2 is not within the set distance range, for example, not within 1 kilometer, it is considered that the first electronic device is not within the back-connection distance range.

It can be understood that when the distance between the first location information of the first electronic device and the current location information of the second electronic device is within the set distance range, i.e., when the first electronic device is within the back-connection distance range, there will be no adjustment of the back-connecting parameter for back-connecting the first electronic device, that is, the first electronic device will be back-connected based on the current back-connecting times, the current back-connecting frequency, and the current back-connecting time interval.

In the present embodiment, the step S2300 of "if a distance between the first location information and the current location information is not within a set distance range, adjusting a back-connecting parameter for back-connecting the first electronic device" may further comprise: if a distance between the first location information and the current location information is not within a set distance range, adjusting at least one of back-connecting frequency of the earphone back-connecting the first electronic device, back-connecting times of the earphone back-connecting the first electronic device, and back-connecting time interval of the earphone back-connecting the first electronic device.

Wherein, the back-connecting time interval is the time interval between two requests for back-connection from the earphone.

In the specific implementation, when the distance between the first location information and the current location information is not within the set distance range, the earphone will adjust the back-connecting times between the earphone and the first electronic device, or adjust the back-connecting frequency between the earphone and the first electronic device, or adjust the back-connecting time interval between the earphone and the first electronic device.

After the execution of the above step S2300 of "if a distance between the first location information and the current location information is not within a set distance range, adjusting a back-connecting parameter for back-connecting the first electronic device", proceeding to:

Step S2400: back-connecting the first electronic device according to an adjusted back-connecting parameter.

In the specific implementation, after the earphone adjusts the back-connecting times between it and the first electronic device, or adjusts the back-connecting frequency between it and the first electronic device, or adjusts the back-connecting time interval between it and the first electronic device, the first electronic device may be back-connected according to the adjusted the back-connecting times, or the adjusted the back-connecting frequency, or the adjusted back-connecting time interval. It can be understood that whether the back-connecting parameter is adjustable or not, According to the embodiment of the present disclosure, for the dual-connection scenario of an earphone, the earphone will first acquire current location information of a second electronic device that has already established a communication connection, as well as first location information of a first electronic device to be back-connected, wherein the first location information is location information of the first electronic device when previously establishing a communication connection with the earphone, and if a distance between the first location information and the current location information is not within a set distance range, adjust a back-connecting parameter for back-connecting the first electronic device, and back-connect the first electronic device according to an adjusted back-connecting parameter. That is, the earphone may, based on current location information of a second electronic device that has already established a communication connection, adjust the back-connecting parameter of the first electronic device to be back-connected, so as to reduce the power consumption caused by back-connecting of the first electronic device, save bandwidth, and avoid influence on the services of the already connected device.

In an embodiment, the connection method for an earphone of the embodiment of the present disclosure further comprises following step S4100 to step S4300:

Step S4100: acquiring a service status between the earphone and the second electronic device.

Wherein, the service status comprises both audio service status and non-audio service status. The audio service status includes, for example but not limited to, scenarios such as the earphone being in a call service with the second electronic device, the earphone being in a gaming mode with the second electronic device, and the earphone being in an audio low-latency mode with the second electronic device.

Step S4200: if the service status is not an audio service status, then executing a step of "back-connecting the first electronic device according to an adjusted back-connecting parameter".

In the present embodiment, when the service status between the earphone and the second electronic device is not the audio service status, it indicates that back-connecting the first electronic device at this time will not influence the second electronic device. At this time, the above step S2400 of back-connecting the first electronic device according to an adjusted back-connecting parameter will be executed, or the first electronic device will be back-connected according to the original back-connecting parameter without adjusting the back-connecting parameter.

Step S4300: if the service status is the audio service status, suspending execution of the step of "back-connecting the first electronic device according to an adjusted back-connecting parameter", and continuing with execution of a step of "acquiring a service status between the earphone and the second electronic device".

In the present embodiment, when the service status between the earphone and the second electronic device is the audio service status, it indicates that back-connecting the first electronic device at this time will influence the second electronic device. Here, it is necessary to stop the back-connecting operation, continue to acquire the service status between the earphone and the second electronic device, and not to execute the back-connecting operation until the service status is not the audio service status.

According to the present embodiment, it is possible to adjust the back-connection timing for the earphone back-connecting the first electronic device according to the service status between the earphone and another device that has established the communication connection, so as to avoid the back-connection from influencing the current service of the earphone and improve the user's experience.

Example

Figure 3:
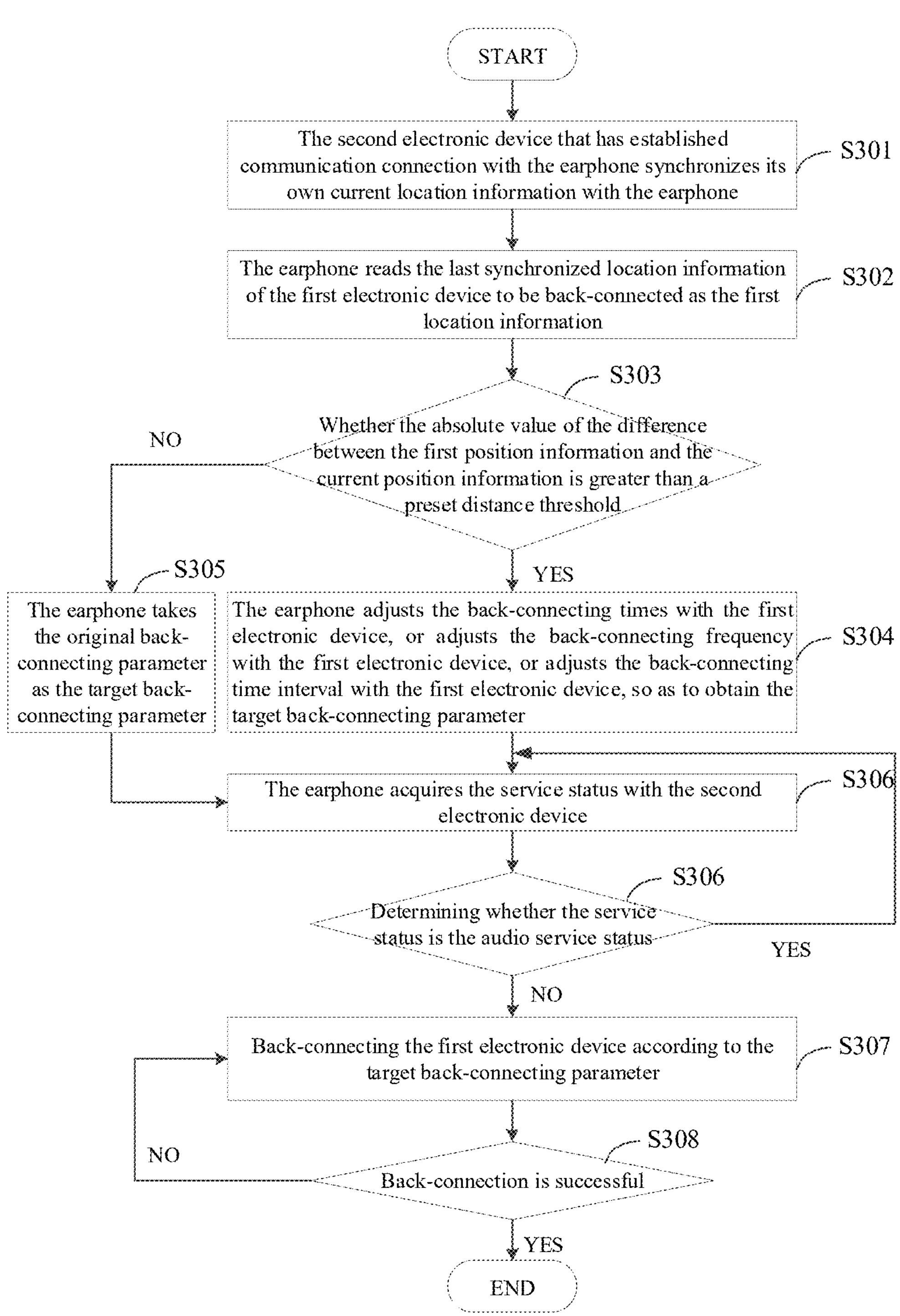
FIG. 3 is a schematic diagram of a connection method for an earphone according to an example of the present disclosure.

The following shows the connection method for an earphone in an example in which, referring to FIG. 3, the connection method for an earphone comprises:

step S301: the second electronic device that has established communication connection with the earphone synchronizes its own current location information with the earphone.

Step S302: the earphone reads the last synchronized location information of the first electronic device to be back-connected as the first location information.

Step S303: calculating whether the absolute value of the difference between the first position information and the current position information is greater than a preset distance threshold, and executing a step S304 if the absolute value of the difference is greater than preset distance threshold, otherwise executing a step S305.

Step S304: the earphone adjusts the back-connecting times with the first electronic device, or adjusts the back-connecting frequency with the first electronic device, or adjusts the back-connecting time interval with the first electronic device, so as to obtain the target back-connecting parameter, and continues to execute a step S306.

Step S305: the earphone takes the original back-connecting parameter as the target back-connecting parameter, and continues to execute the step S306.

Step S306: the earphone acquires the service status with the second electronic device, and determines whether the service status is the audio service status; if yes, continues to execute the step S306; otherwise, executes the step S307.

Step S307: back-connecting the first electronic device according to the target back-connecting parameter.

Step S308: the earphone determines whether back-connection of the first electronic device is successful; if yes, the process ends; otherwise, continues to execute the step S307.

According to the present example, the method for connecting multiple devices is optimized based on the current service scene and the location information of the earphone of the user, so as to reduce meaningless back-connection attempts when another device is out of the connection range, thereby reducing the power consumption of the earphone, avoiding the influence of the back-connection on the current service of the earphone, and improving the user's experience.

Apparatus Embodiment

Figure 4:
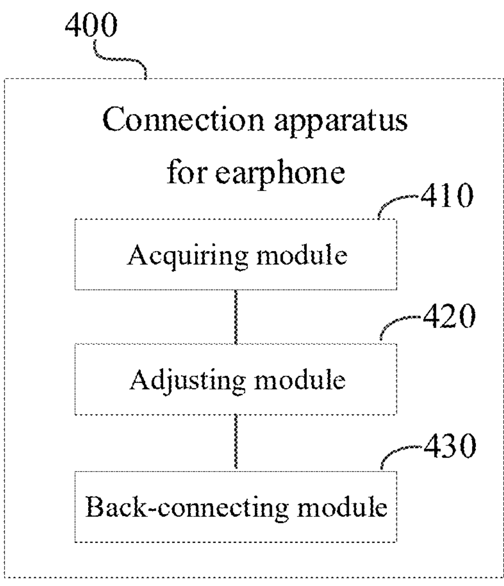
FIG. 4 is a principle block diagram of a connection apparatus for an earphone according to an embodiment of the present disclosure.

FIG. 4 is a structural schematic diagram of a connection apparatus for an earphone according to an embodiment. As shown in FIG. 4, the connection apparatus 400 of the earphone comprises an acquiring module 410, an adjusting module 420, and a back-connecting module 430.

The acquiring module 410 is configured for acquiring first location information of a first electronic device to be back-connected; wherein the first location information is location information of the first electronic device when it previously established a communication connection with the earphone.

The acquiring module 410 is configured for acquiring current location information of a second electronic device that has already established a communication connection.

The adjusting module 420 is configured for, if a distance between the first location information and the current location information is not within a set distance range, adjusting a back-connecting parameter for back-connecting the first electronic device.

The back-connecting module 430 is configured for back-connecting the first electronic device according to an adjusted back-connecting parameter.

In an embodiment, the acquiring module 410 is configured for acquiring a service status between the earphone and the second electronic device.

The back-connecting module 430 is configured for, if the service status is not an audio service status, then executing a step of "back-connecting the first electronic device according to an adjusted back-connecting parameter".

In an embodiment, the back-connecting module 430 is further configured for if the service status is the audio service status, suspending execution of the step of "back-connecting the first electronic device according to an adjusted back-connecting parameter", and continuing to acquire a service status between the earphone and the second electronic device by the acquiring module 410.

In an embodiment, the adjusting module 420 is specifically configured for: if a distance between the first location information and the current location information is not within a set distance range, adjusting at least one of: back-connecting frequency of the earphone back-connecting the first electronic device, back-connecting times of the earphone back-connecting the first electronic device, and back-connecting time interval of the earphone back-connecting the first electronic device.

According to the embodiment of the present disclosure, for the dual-connection scenario of an earphone, the earphone will first acquire current location information of a second electronic device that has already established a communication connection, as well as first location information of a first electronic device to be back-connected, wherein the first location information is location information of the first electronic device when previously establishing a communication connection with the earphone, and if a distance between the first location information and the current location information is not within a set distance range, adjusting a back-connecting parameter for back-connecting the first electronic device, and back-connecting the first electronic device according to an adjusted back-connecting parameter. That is, the earphone may, based on current location information of a second electronic device that has already established a communication connection, adjust the back-connecting parameter of the first electronic device to be back-connected, so as to reduce the power consumption caused by back-connecting the first electronic device, save bandwidth, and avoid affecting the services of the already connected device.

Device Embodiment

Figure 5:
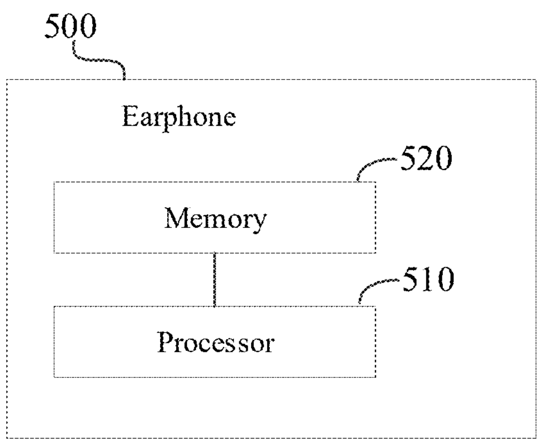
FIG. 5 is a principle block diagram of an earphone according to an embodiment of the present disclosure.

FIG. 5 is a schematic diagram of a hardware structure of an earphone according to an embodiment. As shown in FIG. 5, the earphone 500 comprises a processor 510 and a memory 520.

The memory 520 may be configured for storing executable computer instructions.

The processor 510 may be configured for executing the connection method for the earphone according to method embodiments of the present disclosure according to control of the executable computer instructions.

The earphone 500 may be the earphone 1000 shown in FIG. 1, or may be a device with another hardware configuration, which is not limited herein.

In other embodiments, the earphone 500 may comprise the above connection apparatus 400.

In an embodiment, the modules of the above connection apparatus 400 may be implemented by the processor 510 executing computer instructions stored in the memory 520.

According to embodiments of the present disclosure, for the dual-connection scenario of an earphone, the earphone will first acquire first location information of a first electronic device to be back-connected, and the first location information is location information of the first electronic device when it previously established a communication connection with the earphone; and when the first location information is not within a back-connecting distance range, the method adjusts a back-connecting parameter for back-connecting the first electronic device, and back-connects the first electronic device according to an adjusted back-connecting parameter. Since the back-connecting distance range is associated with current location information of the second electronic device to which the earphone has established a communication connection, that is, the earphone may, based on the current location position of the second electronic device which has established the communication, adjust the back-connecting parameter of the first electronic device to be back-connected, so as to reduce the power consumption caused by back-connecting the first electronic device, save bandwidth, and avoid influencing the services of the already connected device.

Computer-readable Storage Medium

Embodiments of the present disclosure further provides a computer-readable storage medium having computer instructions stored thereon, which executes the connection method for the earphone provided by embodiments of the present disclosure when the computer instructions are run by a processor.

The present disclosure may be a system, a method, and/or a computer program product. The computer program product may comprise a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, comprising an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent.

Embodiments of the present disclosure have been presented for purposes of illustration, but are not intended to be exhaustive or limited to the embodiments disclosed. Numerous modifications and changes will be apparent to those skilled in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the appended claims.

The invention claimed is:

1. A connection method for an earphone, comprising:

acquiring first location information of a first electronic device to be back-connected;

wherein the first location information is location information of the first electronic device during a last communication connection with the earphone;

acquiring current location information of a second electronic device during a current communication connection with the earphone; and if a distance between the first location information and the current location information is outside a set distance range, adjusting a back-connecting parameter for back-connecting the first electronic device; and back-connecting the first electronic device according to an adjusted back-connecting parameter.

2. The method according to claim 1, further comprising:

acquiring a service status between the earphone and the second electronic device; and if the service status is not an audio service status, then executing the back-connecting the first electronic device according to an adjusted back-connecting parameter.

3. The method according to claim 2, further comprising:

if the service status is the audio service status, suspending the back-connecting the first electronic device according to an adjusted back-connecting parameter, and continuing acquiring a service status between the earphone and the second electronic device.

4. The method according to claim 1, wherein said if a distance between the first location information and the current location information is outside a set distance range, adjusting a back-connecting parameter for back-connecting the first electronic device, comprises:

if a distance between the first location information and the current location information is outside a set distance range, adjusting at least one of the following:

back-connecting frequency of the earphone back-connecting the first electronic device, back-connecting times of the earphone back-connecting the first electronic device, and back-connecting time interval of the earphone back-connecting the first electronic device.

5. An earphone, comprising:

a memory configured for storing executable computer instructions; and a processor configured for executing the connection method for the earphone according to claim 1, controlled by the executable computer instructions.

6. A computer-readable storage medium having computer instructions stored thereon, non-transitory configured to executes the connection method for the earphone according to claim 1 when the computer instructions are run by a processor.

7. A connection apparatus for an earphone, comprising:

an acquiring module configured for acquiring first location information of a first electronic device to be back-connected; wherein the first location information is location information of the first electronic device during a last communication connection with the earphone;

the acquiring module is configured for acquiring current location information of a second electronic device during a current communication connection with the earphone;

an adjusting module configured for adjusting a back-connecting parameter for back-connecting the first electronic device, if a distance between the first location information and current location information is outside a set distance range; and a back-connecting module configured for back-connecting the first electronic device according to an adjusted back-connecting parameter.

8. The apparatus according to claim 7, wherein the acquiring module is configured for acquiring a service status between the earphone and a second electronic device; and the back-connecting module is configured for, if the service status is not an audio service status, then back-connecting the first electronic device according to an adjusted back-connecting parameter.

9. The apparatus according to claim 8, wherein the back-connecting module is further configured for, if the service status is the audio service status, suspending back-connection of the first electronic device according to an adjusted back-connecting parameter, and continuing to acquire the service status between the earphone and the second electronic device by the acquiring module.

10. The apparatus according to claim 7, wherein the adjusting module is configured for:

if a distance between the first location information and the current location information is outside a set distance range, adjusting at least one of the following:

back-connecting frequency of the earphone back-connecting the first electronic device, back-connecting times of the earphone back-connecting the first electronic device, and back-connecting time interval of the earphone back-connecting the first electronic device.

* * * * *